US010728632B2

(12) United States Patent
Kim et al.

(10) Patent No.: US 10,728,632 B2
(45) Date of Patent: Jul. 28, 2020

(54) IMAGE DISPLAY DEVICE AND METHOD OF OPERATING THE SAME

(71) Applicant: SAMSUNG ELECTRONICS CO., LTD., Suwon-si, Gyeonggi-do (KR)

(72) Inventors: Mun-seok Kim, Hwaseong-si (KR); Kyung-chul Nam, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 3 days.

(21) Appl. No.: 15/661,222

(22) Filed: Jul. 27, 2017

(65) Prior Publication Data

US 2018/0035178 A1    Feb. 1, 2018

(30) Foreign Application Priority Data

Jul. 27, 2016 (KR) .................. 10-2016-0095490

(51) Int. Cl.
| | | |
|---|---|---|
| *H04N 21/431* | (2011.01) | |
| *H04N 21/858* | (2011.01) | |
| *H04N 21/482* | (2011.01) | |
| *H04N 21/438* | (2011.01) | |
| *H04N 21/488* | (2011.01) | |
| *H04N 21/458* | (2011.01) | |

(52) U.S. Cl.
CPC ....... *H04N 21/858* (2013.01); *H04N 21/4312* (2013.01); *H04N 21/4383* (2013.01); *H04N 21/4821* (2013.01); *H04N 21/4826* (2013.01); *H04N 21/4882* (2013.01); *H04N 21/8586* (2013.01); *H04N 21/458* (2013.01)

(58) Field of Classification Search
CPC .................................................. H04N 21/431
See application file for complete search history.

(56) References Cited

U.S. PATENT DOCUMENTS

| | | | |
|---|---|---|---|
| 6,025,837 A | 2/2000 | Matthews, III et al. | |
| 2005/0144285 A1 | 6/2005 | Hickman | |
| 2008/0271078 A1* | 10/2008 | Gossweiler | ........ H04N 5/44543 |
| | | | 725/40 |

(Continued)

FOREIGN PATENT DOCUMENTS

| | | |
|---|---|---|
| EP | 1 909 498 | 4/2008 |
| KR | 10-2005-0106204 | 11/2005 |

OTHER PUBLICATIONS

Search Report and Written Opinion dated Nov. 6, 2017 in counterpart International Patent Application No. PCT/KR2017/008099.

(Continued)

*Primary Examiner* — Michael H Hong
(74) *Attorney, Agent, or Firm* — Nixon & Vanderhye, P.C.

(57) ABSTRACT

An image display device is provided including a display; a processor; a memory; and one or more programs stored in the memory, the processor being configured to execute the one or more programs, wherein the one or more programs include instructions for: receiving ESG data for generating an electronic service guide (ESG) and linkage service information regarding a service included in the ESG, generating the ESG including an indication whether to provide a target service associated with the service based on the ESG data and the linkage service information, and displaying the ESG on the display.

16 Claims, 14 Drawing Sheets

(56) References Cited

U.S. PATENT DOCUMENTS

| | | | |
|---|---|---|---|
| 2013/0034032 A1* | 2/2013 | Vare | H04L 69/22 |
| | | | 370/310 |
| 2013/0139199 A1 | 5/2013 | Lee et al. | |
| 2014/0130099 A1* | 5/2014 | Kunisetty | H04N 21/4667 |
| | | | 725/50 |
| 2015/0052570 A1 | 2/2015 | Lee et al. | |
| 2016/0277198 A1* | 9/2016 | Kwak | H04W 4/06 |

OTHER PUBLICATIONS

Extended Search Report dated May 22, 2019 in counterpart European Patent Application No. 17834785.2.

DVB Organization: "En300468v1.16.1-rev-115-SI Specification.docx", DVB, Digital Video Broadcasting, C/O EBU-17A Ancienne Route—CH-1218 Grand Saconnex, Geneva-Switzerland, Jul. 7, 2016, XP017852042 (173 pages).

* cited by examiner

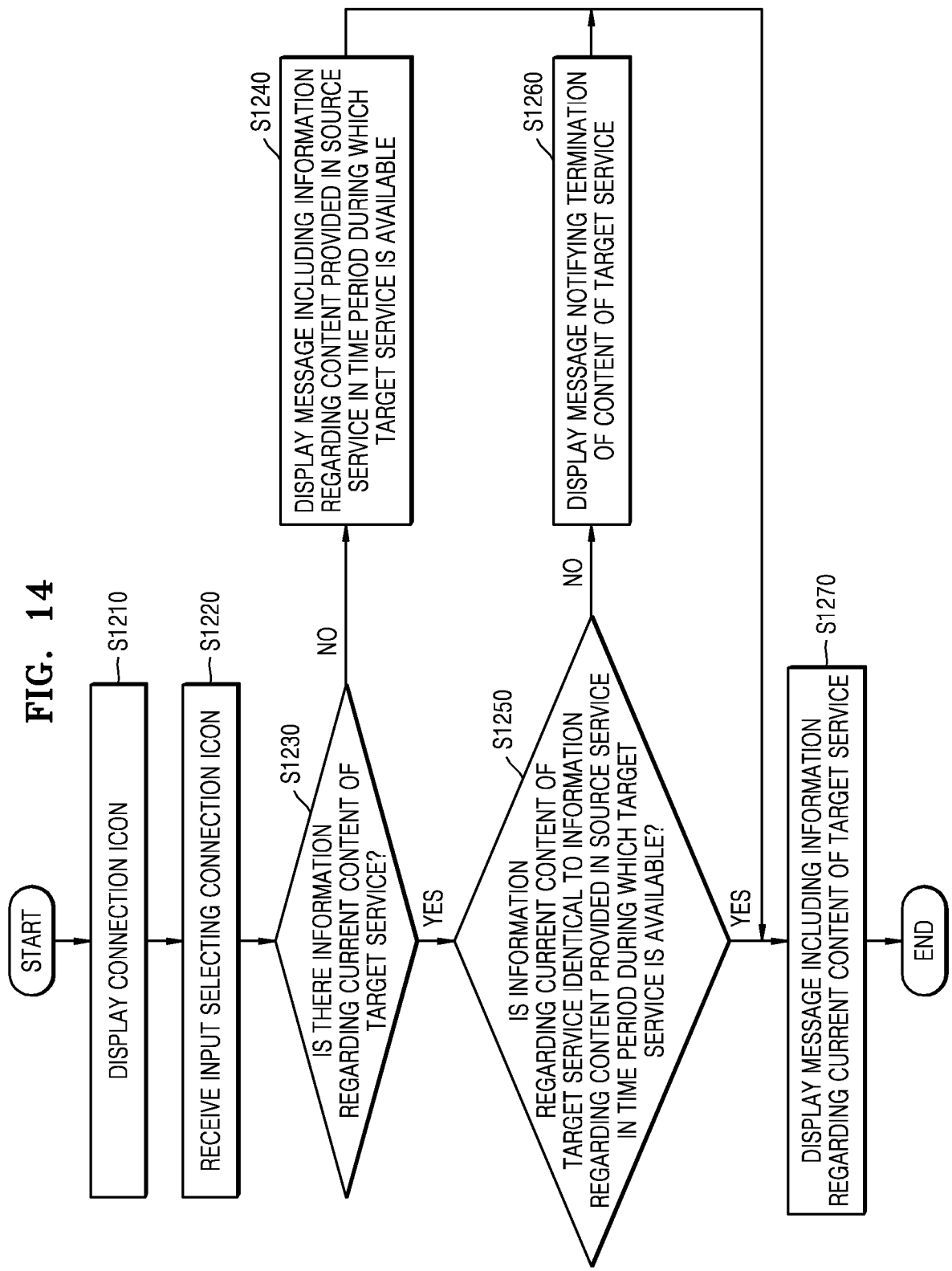

IMAGE DISPLAY DEVICE AND METHOD OF OPERATING THE SAME

CROSS-REFERENCE TO RELATED APPLICATION

This application is based on and claims priority under 35 U.S.C. § 119 to Korean Patent Application No. 10-2016-0095490, filed on Jul. 27, 2016, in the Korean Intellectual Property Office, the disclosure of which is incorporated by reference herein in its entirety.

BACKGROUND

1. Field

The present disclosure relates generally to an image display device and a method of operating the same, and for example, to an image display device capable of displaying linkage service information and a method of operating the same.

2. Description of Related Art

An image display apparatus is an apparatus having a function of displaying an image that a user can view. A user can view a broadcast through the image display apparatus. An image display apparatus displays, on a display, a broadcast selected by a user from among broadcast signals transmitted from a broadcast station.

Also provided is a smart television (TV) that provides various content in addition to a broadcast receiving function. A smart TV may analyze and automatically provide content according to user demand, without any manipulation by the user, rather than be limited to providing content based on manual operation by the user.

ATSC 1.0, a digital broadcasting standard, includes no specification for defining information with respect to services associated with a currently provided service. Therefore, when a current program is extended, the broadcasting station transmitting the current program may continue transmission of the current program or interrupt the current program and transmit the next program. In this case, since the program is arbitrarily selected and transmitted by the broadcasting station without any input or feedback from the user, the user has limited control over which program to watch.

SUMMARY

An image display device capable of displaying an electronic service guide (ESG) or an electronic program guide (EPG) including linkage service information corresponding to at least one service and a method of operating the same are provided.

Additional aspects will be set forth in part in the description which follows and, in part, will be apparent from the description.

According to an aspect of an example embodiment, an image display device includes a display; a processor; and a memory, wherein one or more programs are stored in the memory and the processor is configured to execute the one or more programs, the one or more programs include instructions for: receiving ESG data for generating an electronic service guide (ESG) and linkage service information for a service included in the ESG, generating the ESG including an indication whether to provide a target service associated with the service based on the ESG data and the linkage service information, and displaying the constructed ESG on the display.

According to an aspect of another example embodiment, a method of operating an image display device, the method includes receiving ESG data for generating an electronic service guide (ESG) and linkage service information for a service included in the ESG; and generating the ESG including an indication whether to provide a target service associated with the service based on the ESG data and the linkage service information and displaying the ESG on the image display device.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIGS. 11, 12, 13 and 14 are flowcharts illustrating example methods of operating an image display device according to an example embodiment.

DETAILED DESCRIPTION

Figure 1:
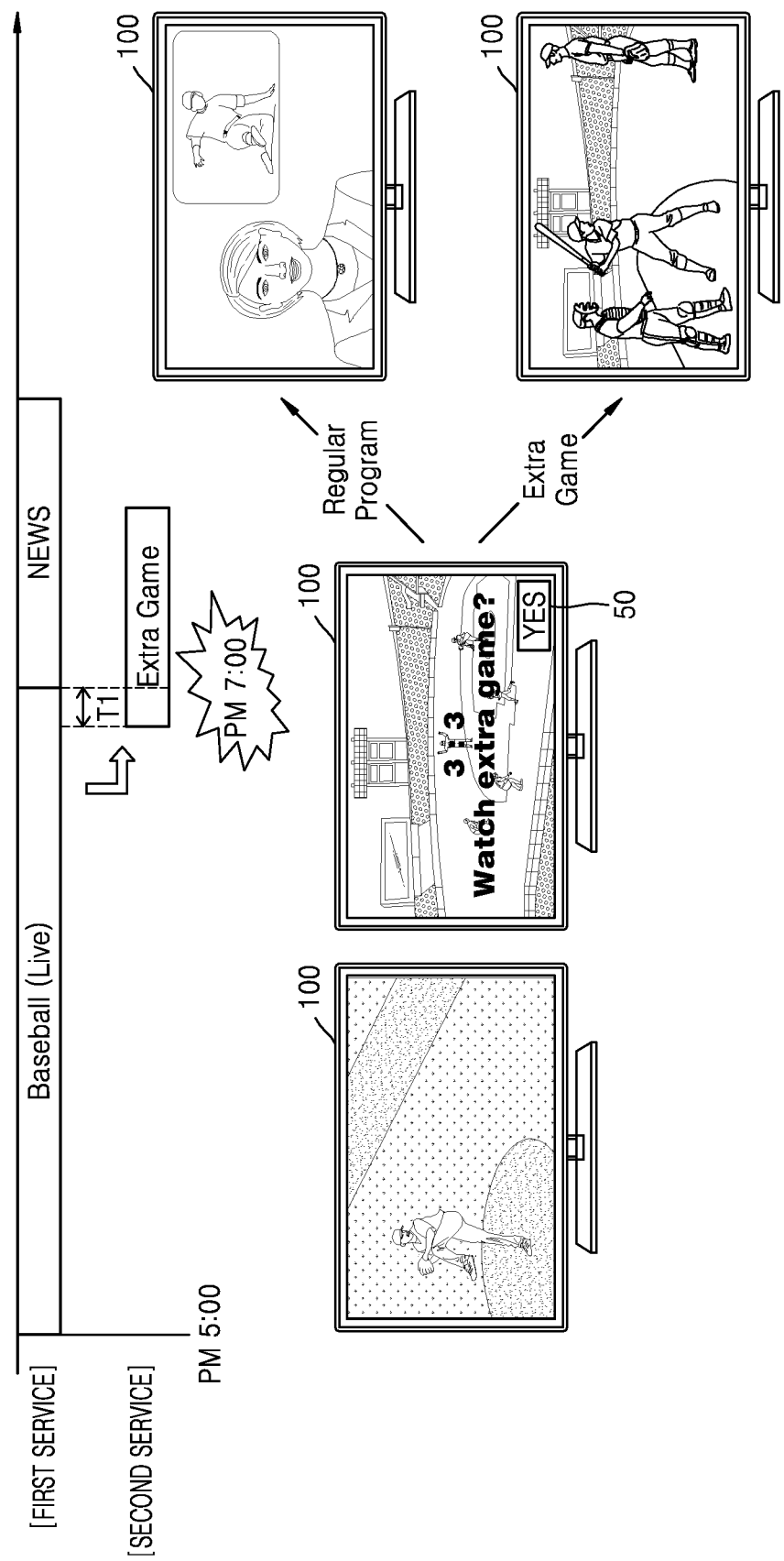
FIG. 1 is a diagram illustrating an example method in which an image display apparatus provides a connected service, according to an example embodiment.

Reference will now be made in detail to various example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, by referring to the figures, to explain various example aspects. Expressions such as "at least one of," when preceding a list of elements, modify the entire list of elements and do not modify the individual elements of the list.

The terms used in this disclosure will be briefly described, and then the present disclosure will be described in greater detail.

With respect to the terms in the various example embodiments of the present disclosure, the general terms which are currently and widely used are selected in consideration of functions of structural elements in the various example embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various example embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification may refer, for example, to units for processing at least one function and operation and can be implemented by hardware components or software components and combinations thereof.

Hereinafter, various example example embodiments of the present disclosure will be described in greater detail with reference to the accompanying drawings. The present disclosure may, however, be embodied in many different forms and should not be construed as limited to the example embodiments set forth herein. In order to clearly illustrate the present disclosure in the drawings, parts not related to the description may be omitted, and like elements are denoted by like reference numerals throughout the disclosure.

FIG. 1 is a diagram illustrating an example method in which an image display apparatus provides a connected service, according to an example embodiment.

As illustrated in FIG. 1, an image display apparatus 100 may be a television (TV), but this is merely an example, and it may be embodied as an electronic apparatus capable of receiving a broadcasting signal and displaying an image based on the broadcasting signal. For example, and without limitation, the image display apparatus 100 may be a mobile phone, a tablet personal computer (PC), a digital camera, a camcorder, a laptop computer, a desktop PC, an e-book terminal, a digital broadcast terminal, a personal digital assistant (PDA), a portable multimedia players (PMP), a navigation device, an MP3 player, a wearable device, or the like. In particular, example embodiments may be easily implemented in a display apparatus having a large display such as a TV, but the present disclosure is not limited thereto.

Furthermore, the image display apparatus 100 may be stationary type or mobile type and may be a digital broadcasting receiver capable of receiving digital broadcasts. Furthermore, the image display apparatus 100 may be embodied not only as a flat-panel display apparatus, but also as a curved display apparatus having a display screen with a curvature or a flexible display apparatus capable of adjusting a curvature of a display screen. The output resolution of the image display apparatus 100 may include, for example, and without limitation, high definition (HD), full HD, ultra HD, or a resolution that is clearer than ultra HD.

The term "user" in the present example embodiment may refer, for example, to a person who controls the function or operation of the image display apparatus 100 using a control device and may include a viewer, an administrator, or an installation technician.

Meanwhile, a service provided by the image display apparatus 100 according to an example embodiment may include at least one component. A service may, for example, refer to a collection of media components that are provided to a user, where the components may be media in various formats. Furthermore, one service may be provided continuously or intermittently and may be provided in real time or non-real time. A real-time service may include a series of TV programs. Furthermore, the service according to an example embodiment may include a broadcast service, and the broadcast service may include at least one content component.

For example, referring to FIG. 1, the image display apparatus 100 may provide a first service, and the first service may include a first content component and a second content component. Here, the first content component may correspond to a baseball broadcasting program, whereas the second content component may correspond to a news broadcasting program.

The image display device 100 may receive linkage service information corresponding to the first service. The linkage service information may include information regarding a service (e.g., a target service) associated with the first service, information indicating a time period during which the target service is available (may include an active time and a inactive time), information regarding a linkage type, information regarding a transmission protocol for the target service (e.g., information regarding whether the target service is provided via a broadcasting network or an Internet network), and information regarding capability of a receiver required to reproduce the target service, etc. However, the present disclosure is not limited thereto.

The image display apparatus 100 may receive a service level signaling (SLS) and obtain linkage service information from the SLS. For example, the image display apparatus 100 may obtain linkage service information based on a service linkage element in a user service bundle description (USBD) fragment included in the SLS.

As illustrated in FIG. 1, even when a baseball game being broadcast in the first service is extended, the baseball broadcasting program is terminated according to a broadcast schedule of the first service. At this time, the broadcasting station may provide an extended baseball broadcasting program in a second service different from the first service. For example, when it is scheduled for the first service to provide the baseball broadcasting program from 5:00 pm to 7:00 pm and to provide a news broadcasting program from 7:00 pm to 8:00 pm, a baseball broadcast after 7:00 pm may be provided by the second service different from the first service.

In this case, the image display apparatus 100 according to an example embodiment may receive linkage service information for the first service. At this time, the linkage service information for the first service may include information regarding a second service connected to the first service (e.g., information regarding the second service), information indicating a time period during which the second service is available (including an active time and an inactive time), information regarding a link type, or the like.

The image display apparatus 100 may display a user interface (UI) screen image including an object 50 for switching to the second service in a screen image provided by the first service during a time period T1 during which the second service is available. When the image display apparatus 100 receives an input to switch to the second service, the image display apparatus 100 may switch the first service to the second service and provide the baseball broadcasting extended in the second service.

On the other hand, when no input to switch to the second service is received and the time period during which the second service is available expires, the image display apparatus 100 may terminate displaying of the UI screen image for switching to the second service. Furthermore, the image display apparatus 100 may provide a news broadcast according to the broadcast schedule of the first service.

Meanwhile, when a UI screen image for switching to the second service is provided in a screen image provided by the first service during the time period T1 during which the second service is available, only a user who was watching a baseball broadcasting program in the first service may switch to the second service.

Figure 2:
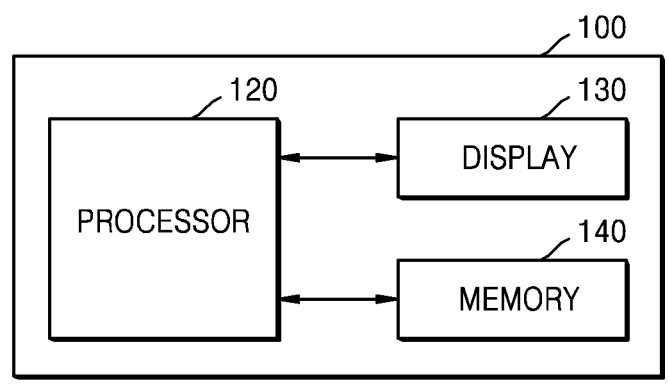
FIG. 2 is a block diagram illustrating an example configuration of an image display apparatus according to an example embodiment.

FIG. 2 is a block diagram illustrating an example configuration of an image display apparatus according to an example embodiment.

Referring to FIG. 2, the image display apparatus 100 according to an example embodiment may include a processor (e.g., including processing circuitry) 120, a display 130, and a memory 140.

The display 130 according to an example embodiment converts a video signal, a data signal, an on-screen-display (OSD) signal, a control signal, and the like processed by the processor 120 and generates a driving signal. The display 130 may be implemented as a plasma display panel (PDP), a liquid crystal display (LCD), an organic light-emitting diode (OLED), a flexible display, or a 3D display, or the like, but is not limited thereto. Furthermore, the display 130 may be configured as a touch screen and used not only as an output device, but also as an input device.

The display 130 according to an example embodiment may display an electronic service guide (ESG) or an electronic program guide (EPG). An ESG or an EPG may include information regarding broadcasting channels in which services are provided, information regarding service providers, information regarding content (broadcasting programs) included in the services, schedule information regarding the content (information regarding starting times and ending times of the content), etc. However, the present disclosure is not limited thereto.

The processor 120 according to an example embodiment may include various processing circuitry and execute one or more programs stored in the memory 140. The processor 120 may include, for example, and without limitation, a single core, dual cores, triple cores, quad cores, and cores of multiples thereof. Furthermore, the processor 120 may include a plurality of processors. For example, the processor 120 may be implemented as a main processor (not shown) and a sub processor (not shown) operating in a sleep mode.

The memory 140 according to an example embodiment may store various data, programs, or applications for driving and controlling the image display apparatus 100.

The memory 140 according to an example embodiment may store ESG data constituting an ESG and linkage service information for services included in the ESG.

Furthermore, the program stored in the memory 140 may also include one or more instructions. A program (one or more instructions) or an application stored in the memory 140 may be executed by the processor 120.

The processor 120 according to an example embodiment may generate an ESG that indicates whether to provide a target service associated with a service, based on ESG data and linkage service information, and may control the display 130 to display the composed ESG.

Furthermore, the processor 120 may update the ESG data and the linkage service information. Furthermore, the processor 120 may receive a SLS regarding a service and control the image display apparatus 100 to obtain linkage service information from a USBD fragment included in the SLS.

Furthermore, when a current time is included in a time period during which a target service is available, the processor 120 may display a connection icon in a region corresponding to a source service in an ESG, the source service associated with the target service in the ESG. Furthermore, when the source service associated with the target service includes content provided during the time period during which the target service is available, the processor 120 may display a connection icon in a region corresponding to the content.

Furthermore, the processor 120 may switch a current service to a target service in response to an input selecting a connection icon. Alternatively, the processor 120 may display a message inquiring whether to switch the current service to the target service.

Figure 3:
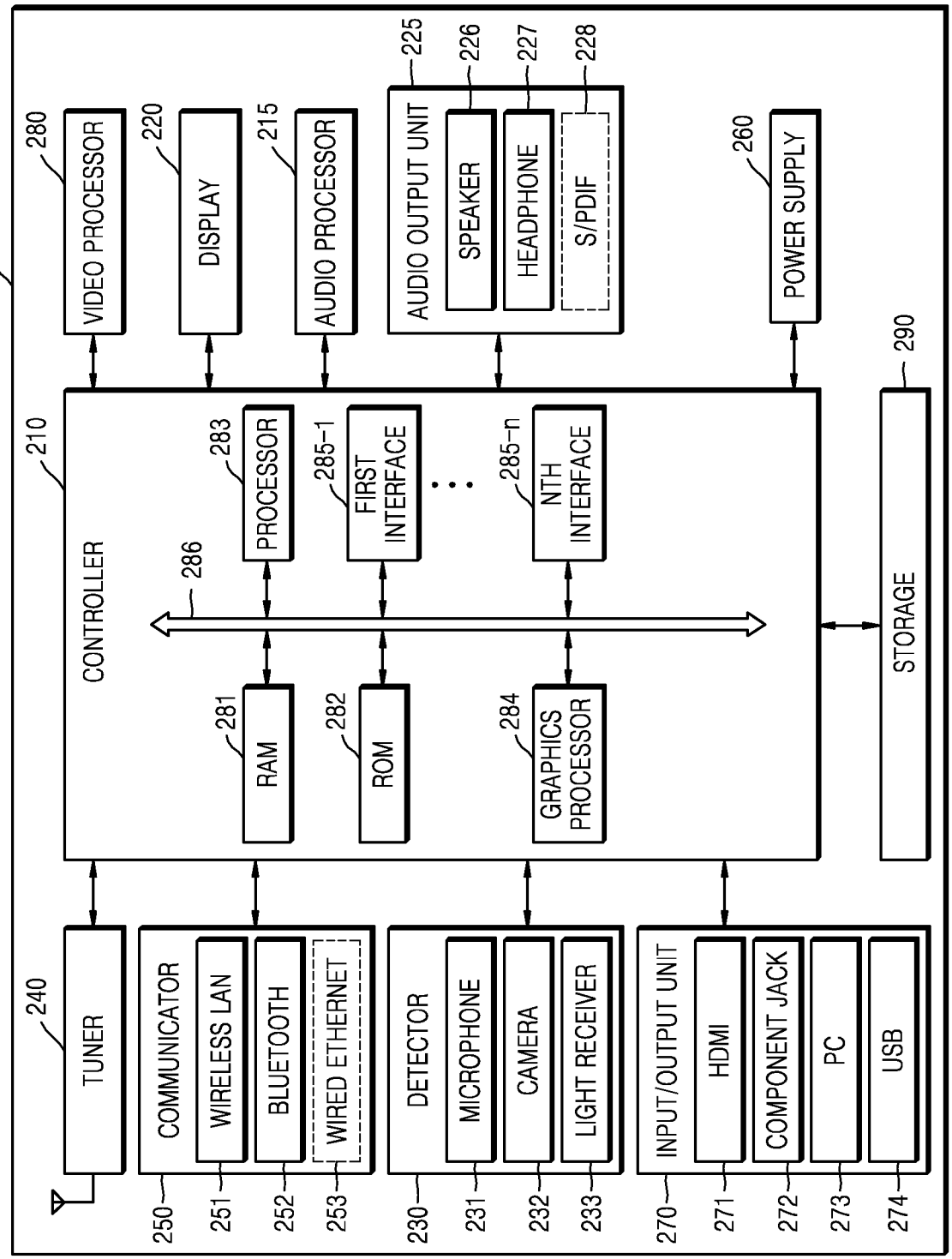
FIG. 3 is a block diagram illustrating an example configuration of an image display apparatus according to another example embodiment.

FIG. 3 is a block diagram illustrating an example configuration of an image display apparatus according to another example embodiment. The image display apparatus 200 of FIG. 3 may be a modified example embodiment of the image display apparatus 100 of FIG. 1.

Referring to FIG. 3, the image display apparatus 200 may include a controller (e.g., including processing circuitry) 210, a display 220, a detector (e.g., including detecting circuitry) 230, a video processor 280 an audio processor 215, an audio output unit (e.g., including audio output circuitry) 225, a power supply 260, a tuner 240, a communicator (e.g., including communication circuitry) 250, a input/output unit (e.g., including input/output circuitry) 270, and a storage 290.

The processor 120 of FIG. 2 may correspond to the controller 210 of FIG. 3, the memory 140 of FIG. 2 may correspond to the storage unit 290 of FIG. 3, and the display 130 of FIG. 2 may correspond to the display 220 of FIG. 3. Descriptions identical to those given above with reference to FIG. 2 will be omitted below.

The communicator 250 may include various communication circuitry and transmit and receive data or signals to and from an external device or a server under the control of the controller 210. The controller 210 may transmit and receive content to an external device connected via the communicator 250, download an application from an external device, or perform web browsing. The communicator 250 may transmit and receive data or signals to and from the image display apparatus 200 according to at least one of a wireless local area network (LAN) (e.g., Wi-Fi), Bluetooth, and wired Ethernet in correspondence to the performance and structure of the image display apparatus 200. Furthermore, the communicator 250 may include various communication circuitry, such as, for example, and without limitation, at least one of a wireless LAN 251, a Bluetooth 252, and a wired Ethernet 253. The communicator 250 may further include other short-distance communication protocols other than Bluetooth, e.g., a near-field communication (NFC; not shown) and a Bluetooth low energy (BLE; not shown).

The tuner 240 may receive a broadcasting signal received via a wire or wirelessly and tune and select only the frequency of a channel to be received by the image display apparatus 100 from among many radio wave components through amplification, mixing, resonance, or the like. A broadcasting signal includes audio, video, and additional information (e.g., electronic service guide (ESG), electronic program guide (EPG), etc.).

The tuner 240 may receive a broadcasting signal in a frequency band corresponding to a channel number based on a user input (e.g., a control signal received from the control device 300 including a channel number input, a channel up/down input, and a channel input in an EPG screen image).

The tuner 240 may receive broadcasting signals from various sources such as ground wave broadcasts, cable broadcasts, satellite broadcasts, Internet broadcasts, and the like. The tuner 240 may receive a broadcasting signal from a source, such as an analog broadcast or a digital broadcast. A broadcasting signal received via the tuner 240. A broadcasting signal received by the tuner 240 is decoded (e.g., audio decoding, video decoding, or additional information decoding) and is split to an audio signal, a video signal, and/or additional information. The audio signal, the video signal, and/or the additional information obtained from the broadcasting signal may be stored in the image display device 200 under the control of the controller 210. The image display device 200 may include one tuner 240 or a plurality of tuners 240. The tuner 240 may be integrated with the image display device 200, may be embodied as an independent device (e.g., a set-top box (not shown)) having a tuner electrically connected to the image display device 200, or may be embodied as a tuner connected to the input/output unit 270.

The video processor 280 may include various circuitry that processes video data received by the image display device 200. The video processor 280 may perform various image processing operations with regard to video data, such as decoding, scaling, noise filtering, frame rate conversion, and resolution conversion.

The display 220 displays a video included in a broadcasting signal received via the tuner 240 under the control of the controller 210. Furthermore, the display 220 may display content (e.g., moving pictures) input via the communicator 250 or the input/output unit 270. The display 220 may output an image stored in the storage 290 under the control of the controller 210. Furthermore, the display 220 may display a voice user interface (UI) (e.g., a UI including a voice command guide) for performing a voice recognition task or a motion UI (e.g., a UI including a user motion guide for motion recognition) for performing a motion recognition task.

The audio processor 215 may include various circuitry that processes audio data. The audio processor 215 may perform various audio processing operations including decoding, amplification, and noise filtering with regard to audio data. Meanwhile, the audio processor 215 may include a plurality of audio processing modules for processing audio data corresponding to a plurality of contents.

The audio output unit 225 may include various audio output circuitry that outputs an audio included in a broadcasting signal received via the tuner 240 under the control of the controller 210. The audio output unit 225 may output an audio (e.g., a voice, a sound) input via the communicator 250 or the input/output unit 270. Furthermore, the audio output unit 225 may output an audio stored in the storage 290 under the control of the controller 210. The audio output unit 225 may include various audio output circuitry, such as, for example, and without limitation, at least one of a speaker 226, a headphone output port 227, and a Sony/Philips digital interface (S/PDIF) output port 228. The audio output unit 225 may include a combination of the speaker 226, the headphone output port 227, and the S/PDIF output port 228.

The power supply 260 supplies power input from an external power source to internal components of the image display device 200 under the control of the controller 210. Furthermore, the detector 230 may supply power output by one, two, or more batteries (not shown) arranged in the image display device 200 to the internal components of the image display device 200 under the control of the controller 210

The detector 230 may include various circuitry that detects a voice of a user, an image of the user, or an interaction of the user.

A microphone 231 receives a voice uttered by a user. The microphone 231 may transform a received voice into an electric signal and output the electric signal to the controller 210. A voice of a user may include a voice corresponding to a menu or a function of the image display device 200, for example. The microphone 231 may be integrated with the image display device 200 or may be embodied as an independent device. The independent microphone 231 may be electrically connected to the image display device 200 via the communicator 250 or the input/output unit 270.

A camera 232 receives an image (e.g., successive frames) corresponding to a user's motion including a gesture within a recognition range of the camera 232. A user's motion may include a motion of a body part of the user, e.g., a face, a face expression, a hand, a fist, a finger, etc. The camera 232 may transform a received image into an electric signal and output the electric signal to the controller 210, under the control of the controller 210.

The controller 210 may select a menu displayed on the image display device 200 by using a result of recognizing a received motion or perform a task corresponding to the result of the motion recognition, e.g., changing channel, adjusting volume, moving a cursor, etc.

A light receiver 233 receives an optical signal (including a control signal) from the external control device 200 via an optical window (not shown) of the bezel of the display 220. The light receiver 233 may receive an optical signal corresponding to a user input (e.g., a touch, a press, a touch gesture, a voice, or a motion) from the control device 200. A control signal may be extracted from the received optical signal under the control of the controller 210.

The input/output unit 270 may include various circuitry that receives a video (e.g., moving pictures, etc.), an audio (e.g., voice, music, etc.), and additional information (e.g., an EPG, etc.) from outside of the image display device 200 under the control of the controller 210. The input/output unit 270 may include various input/output circuitry, such as, for example, and without limitation, at least one of a high-definition multimedia interface port 271, a component jack 272, a PC port 273, and a USB port 274. The input/output unit 270 may include a combination of the HDMI port 271, the component jack 272, the PC port 273, and the USB port 274.

It would be apparent to one of ordinary skill in the art that configurations and operations of the input/output unit 270 may vary according to example embodiments of the present disclosure.

The controller 210 may include various processing circuitry and controls the overall operations of the image display device 200, controls signal flows between internal components of the image display device 200, and processes data. When a user input is applied or a certain condition is satisfied, the controller 210 may execute an operating system (OS) and various applications stored in the storage 290.

The controller 210 may include a RAM 281 that stores a signal or data received from outside of the image display device 200 or is used as a storage area corresponding to various tasks performed by the image display device 200, a ROM 282 having stored therein control programs for controlling the image display device 200, and a processor 283.

The processor 283 may include a graphics processing unit (GPU) (not shown) for processing graphics data corresponding to a video. The processor 283 may be embodied as a system-on-chip (SoC) having integrated thereon a core (not shown) and a GPU (not shown).

A graphics processor 284 generates a screen image including various objects, such as icons, images, and texts, by using a processor (not shown) and a renderer (not shown). The processor calculates property values, such as coordinate values, shapes, sizes, and colors, for displaying respective objects according to a layout of a screen image by using a user input detected by the detector 230. The renderer generates screen images having various layouts including objects based on property values calculated by the processor. A screen image generated by the renderer is displayed within a display area of the display 220.

First through nth interfaces 285-1 through 285-n are connected to the above-stated components. One of the first through nth interfaces 285-1 through 285-n may be a network interface that is connected to an external device via a network.

The RAM 281, the ROM 282, the processor 283, the graphics processor 284, and the first through nth interfaces 285-1 through 285-n may be connected to one another via an internal bus 286.

In the present example embodiment, the term 'controller of the image display device' includes, for example, and without limitation, the processor 283, the ROM 282, and the RAM 281.

The storage 290 may store various data, programs, or applications for operating and controlling the image display device 200 under the control of the controller 210. The storage 290 may store signals or data input/output in correspondence to operations of the video processor 280, the display 220, the audio processor 215, the audio output unit 225, the power supply 260, the tuner 240, the communicator 250, the detector 230, and the input/output unit 270. The storage 290 may store control programs for controlling the image display device 200 and the controller 210, applications initially provided by a manufacturer of the image display device 200 or downloaded from outside, graphical user interfaces (GUI) related to the applications, objects (e.g., images, texts, icons, buttons, etc.) for providing the GUIs, user information, documents, databases, or data related thereto.

According to an example embodiment, the term "storage" includes the storage 290, the ROM 282 and the RAM 281 of the controller 210, and/or a memory card (not shown) attached to the image display device 200 (e.g., a micro SD card, a USB memory, etc.). Furthermore, the storage 290 may include a non-volatile memory, a volatile memory, a hard disk drive (HDD), or a solid state disk (SSD).

Although not shown, the storage 290 may include various modules, each including various program elements, such as, for example, and without limitation, a broadcast receiving module, a channel control module, a volume control module, a communication control module, a voice recognition module, a motion recognition module, an optical receiving module, a display control module, an audio control module, an external input control module, a power control module, a module for controlling a wirelessly connected external device (e.g., connected via a Bluetooth communication), a voice database (DB), or a motion DB. The modules (not shown) and the DB (not shown) of the storage 290 may be embodied in the form of software for controlling the image display device 200 to perform a broadcast reception control function, a channel control function, a volume control function, a communication control function, a voice recognition function, a motion recognition function, an optical reception control function, a display control function, an audio control function, an external input control function, a power control function, or a function for controlling a wirelessly connected external device (e.g., connected via a Bluetooth communication). The controller 210 may perform the above-stated functions by using the software modules stored in the storage 290.

The display apparatus 200 including the display 220 may be electrically connected to an independent external device including a tuner. For example, the display apparatus 200 may be embodied, for example, and without limitation, as an analog TV, a digital TV, a 3D TV, a smart TV, a LED TV, an OLED TV, a plasma TV, or a monitor. However, it would be obvious to one of ordinary skill in the art that the inventive concept is not limited thereto.

The image display device 200 may include a sensor (not shown) for detecting a condition inside or outside the image display device 200 (e.g., an illuminance sensor, a temperature sensor, etc.).

Meanwhile, the block diagrams of the image display devices 100 and 200 shown in FIGS. 2 and 3 are block diagrams merely illustrating example embodiments.

Components shown in FIGS. 2 and 3 may be integrated with one another, may include additional components, or may be omitted according to the specifications of the actual image display devices 100 and 200. In other words, when necessary, two or more components may be combined into a single component or a single component may be split into two or more components. Furthermore, functions performed by respective components are merely for describing example embodiments and do not limit the present disclosure.

Figure 4:
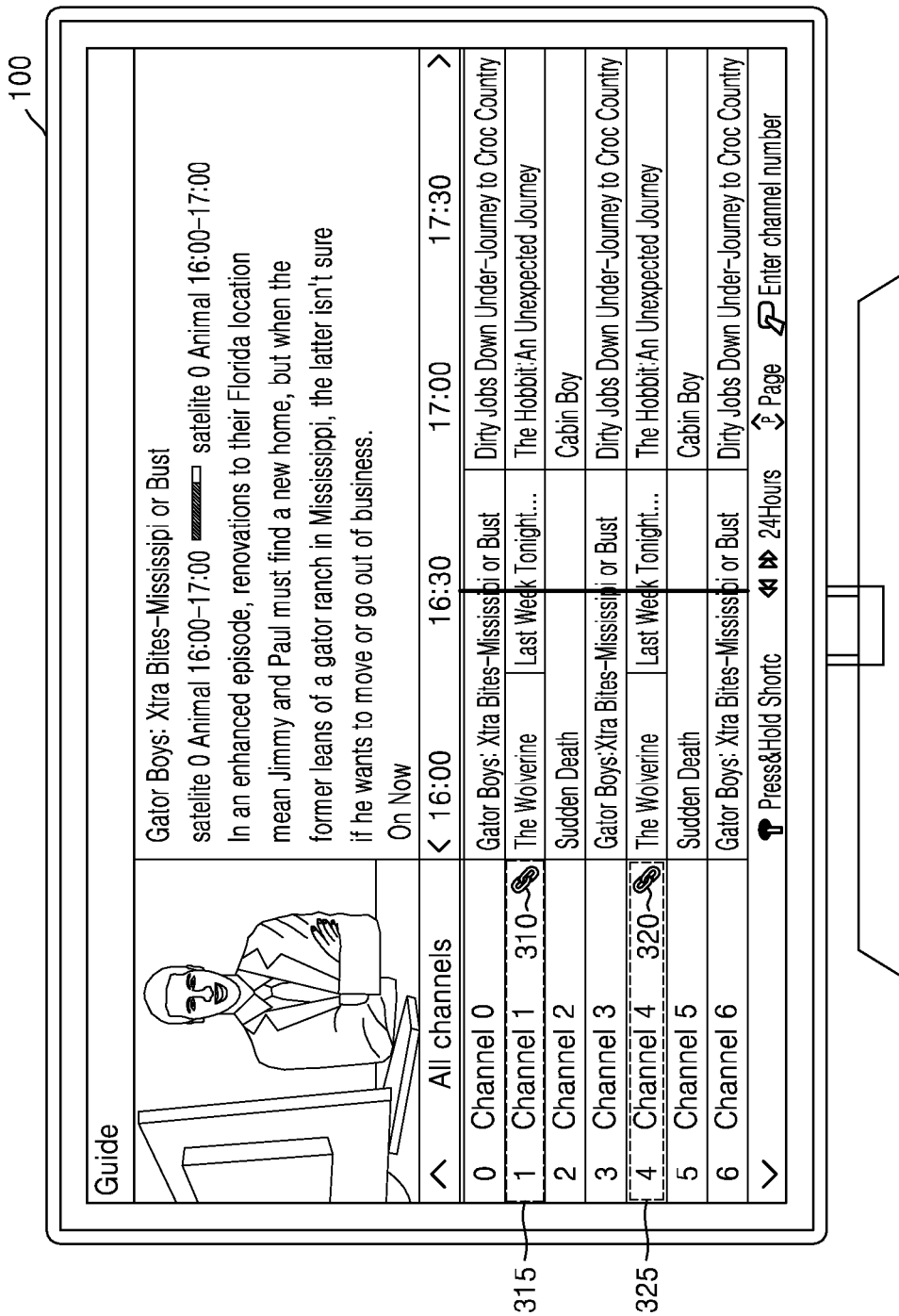
FIGS. 4 and 5 are diagrams illustrating examples of screen images displayed on an image display device according to an example embodiment.
Figure 5:
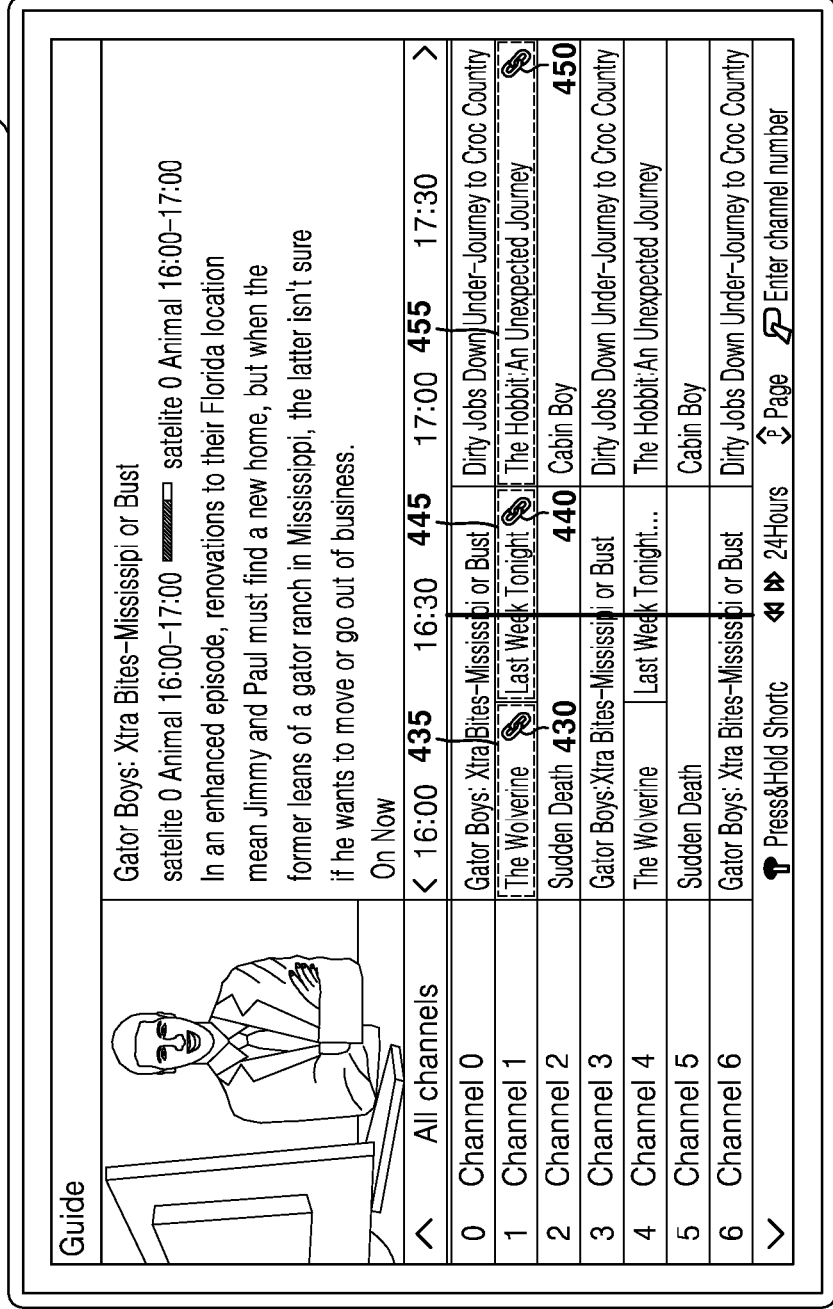

FIGS. 4 and 5 are diagrams illustrating examples of screen images displayed on an image display device according to an example embodiment.

Referring to FIG. 4, the image display device 100 may display information regarding at least one service provided by the image display device 100 as an electronic service guide (ESG) or an electronic program guide (EPG). For example, an ESG or an EPG may include a broadcasting channel for providing a service, information regarding a service provider, information regarding content (broadcasting program) included in the service, schedule information regarding content (information regarding starting times and ending times of the content), or the like. Hereinafter, for convenience of explanation, example embodiments will be described based on an ESG, but the same may be applied to an EPG.

The image display device 100 according to an example embodiment may receive ESG data for constructing an ESG and linkage service information for a service included in the ESG. For example, the image display device 100 may receive ESG data and linkage service information through a broadcasting network or a broadband (Internet network). In this case, when ESG data and linkage service information are received through the broadcasting network, ESG data and linkage service information may be received while browsing through necessary services.

The ESG data is data indicating information regarding use of a service and may include service information (e.g., a service fragment), content information (e.g., a content fragment), schedule information (e.g., a schedule fragment), etc. The service information includes an overall description regarding the service and may include a service identifier, a service name, a language of the service, a service number, a service description, a service type, etc. For example, one service may correspond to one broadcasting channel. However, the present disclosure is not limited thereto. The content information may include information regarding content included in the service and may include a content identifier. For example, one content may correspond to one broadcasting program, but the present disclosure is not limited thereto. The schedule information indicates information regarding services according to time periods and may include information regarding starting times and ending times of content.

The linkage service information according to an example embodiment includes target service information, information indicating a time period during which the target service is available (may include an active time and a inactive time), information regarding a link type, information regarding a transmission protocol for the target service (e.g., information regarding whether the target service is provided via a broadcasting network or an Internet network), and information regarding capability of a receiver required to reproduce the target service, etc. Furthermore, the image display apparatus 100 may obtain linkage service information based on a service layer signaling (SLS). For example, the image display apparatus 100 may obtain linkage service information based on a service linkage element in a user service bundle description (USBD) fragment included in the SLS.

The image display device 100 according to an example embodiment may construct and display an ESG including a list of contents to be provided according to time periods in each of a plurality of services, by using the ESG data. Furthermore, the image display device 100 may display a linkage service available at a current time on an ESG by using the ESG data and the linkage service information.

The image display device 100 according to an example embodiment may determine whether there is a target service available at a current time by using information indicating a time period during which the target service is available from among linkage service information for at least one service included in the ESG.

For example, as illustrated in FIG. 4, when a current time (e.g., 16:30) is included in a time period (e.g., 16:25-16:35) during which a first target service connected to a first service (e.g., "channel 1") is available, the image display device 100 may display a first connection icon 310 in a region 315 corresponding to the first service. Furthermore, when a current time (e.g., 16:30) is included in a time period (e.g., 16:15-16:40) during which a second target service connected to a second service (e.g., "channel 4") is available, the image display device 100 may display a second connection icon 320 in a region 325 corresponding to the second service.

Furthermore, referring to FIG. 5, the image display device 100 according to an example embodiment may display a connection icon in a region corresponding to content provided in a time period during which a target service is available (e.g., active time of the target service) in a source service connected to the target service.

For example, as shown in FIG. 5, when the active time (time at which connection becomes available) of a first target service available at a current time is between a starting time and an ending time of first content provided in a first service (a source service, e.g., "channel 1") in the past, a connection icon 430 regarding the first target service may be displayed in a region 435 corresponding to the first content.

Alternatively, when the active time of a second target service available at a current time is between the starting time and the ending time of second content currently being provided by the first service, a connection icon 440 may be displayed in a region 445 corresponding to the second content.

Alternatively, based on a current time, when the active time of a third target service that may be available in the future is between the starting time and the ending time of third content to become available in the first service in the future, a connection icon 450 regarding the third target service may be displayed in the area 455 corresponding to the third content.

Furthermore, when ESG data regarding the target service is received, the image display device 100 according to an example embodiment may display ESG information regarding the target service including information regarding a broadcasting channel for providing the target service, information regarding a provider of the target service, information regarding content (broadcasting program) included in the target service, schedule information regarding content (information regarding starting times and ending times of the content), etc. Alternatively, the image display device 100 may display ESG information regarding the target service only when an input selecting a connection icon regarding the target service is received. However, the present disclosure is not limited thereto.

Figure 6:
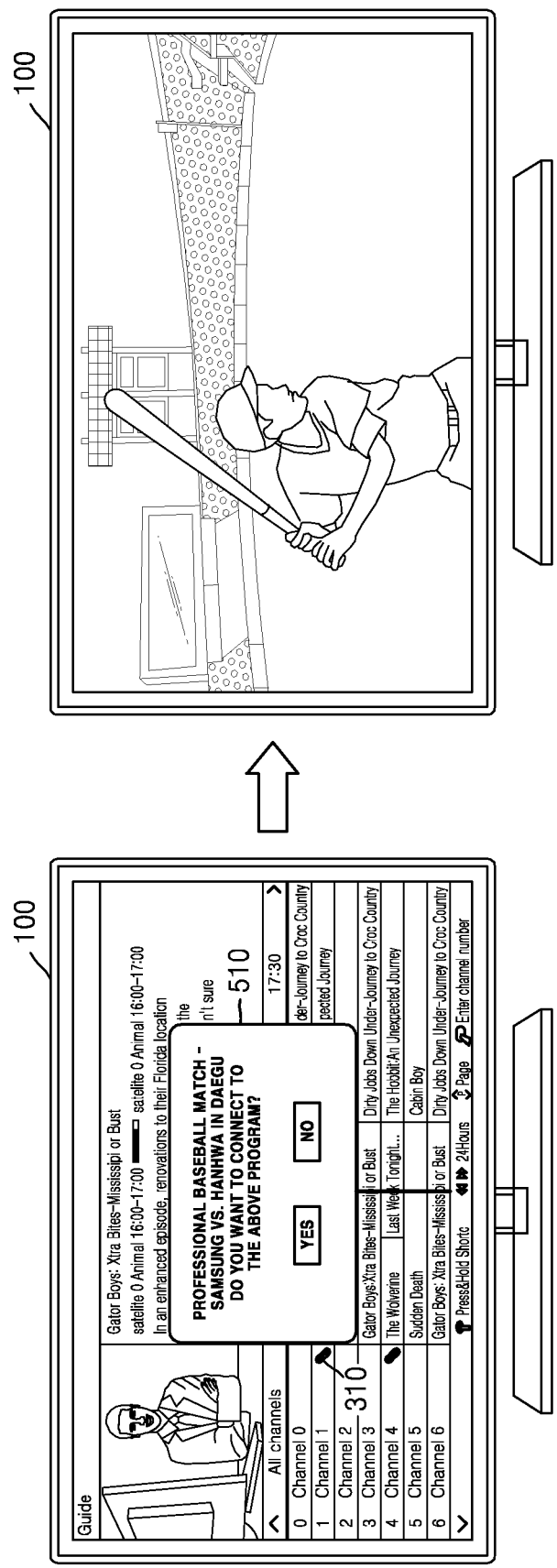
FIGS. 6, 7 and 8 are diagrams illustrating an example method of operating an image display device when an input selecting a connection icon is received according to an example embodiment.
Figure 7:
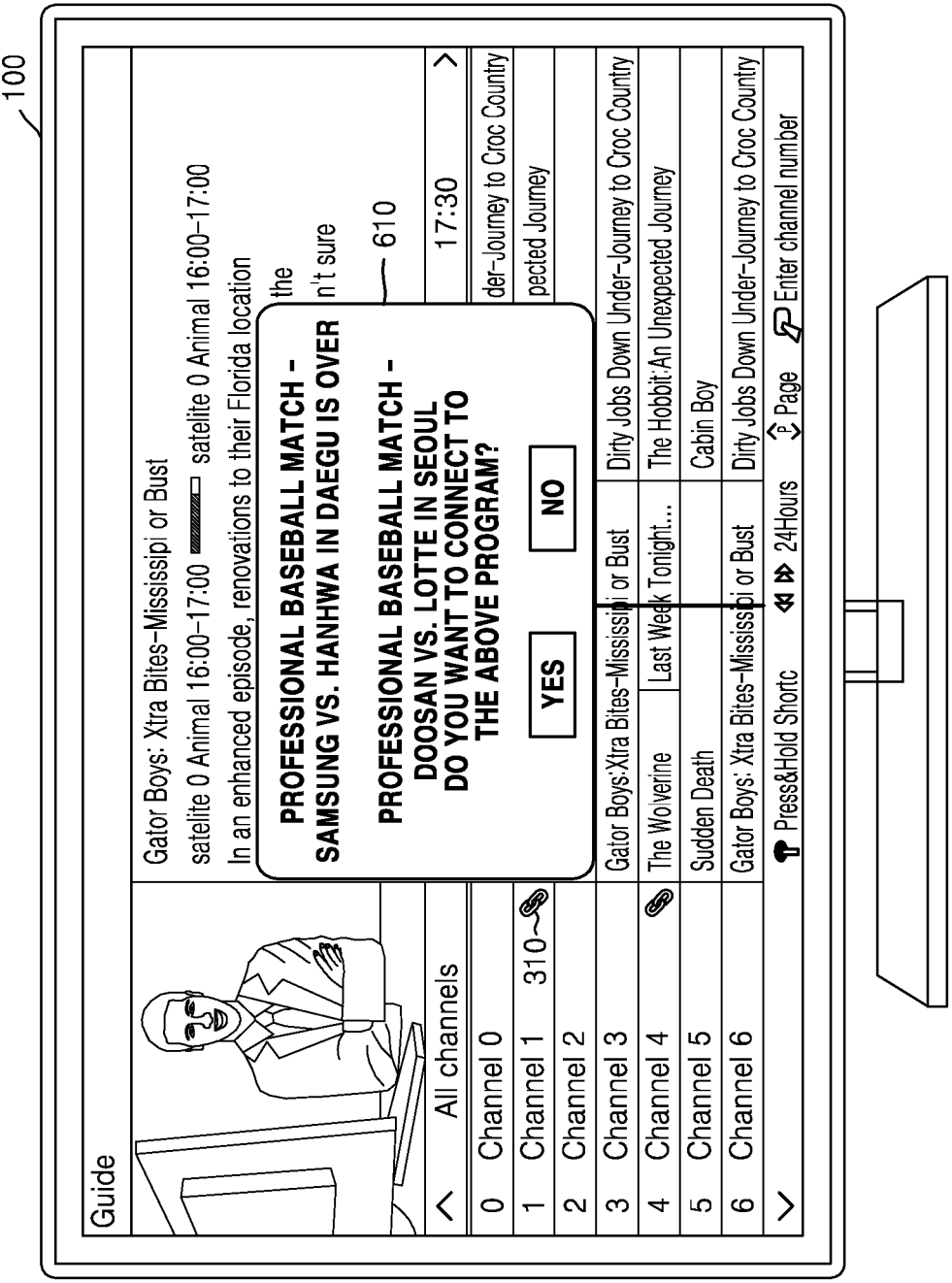
Figure 8:
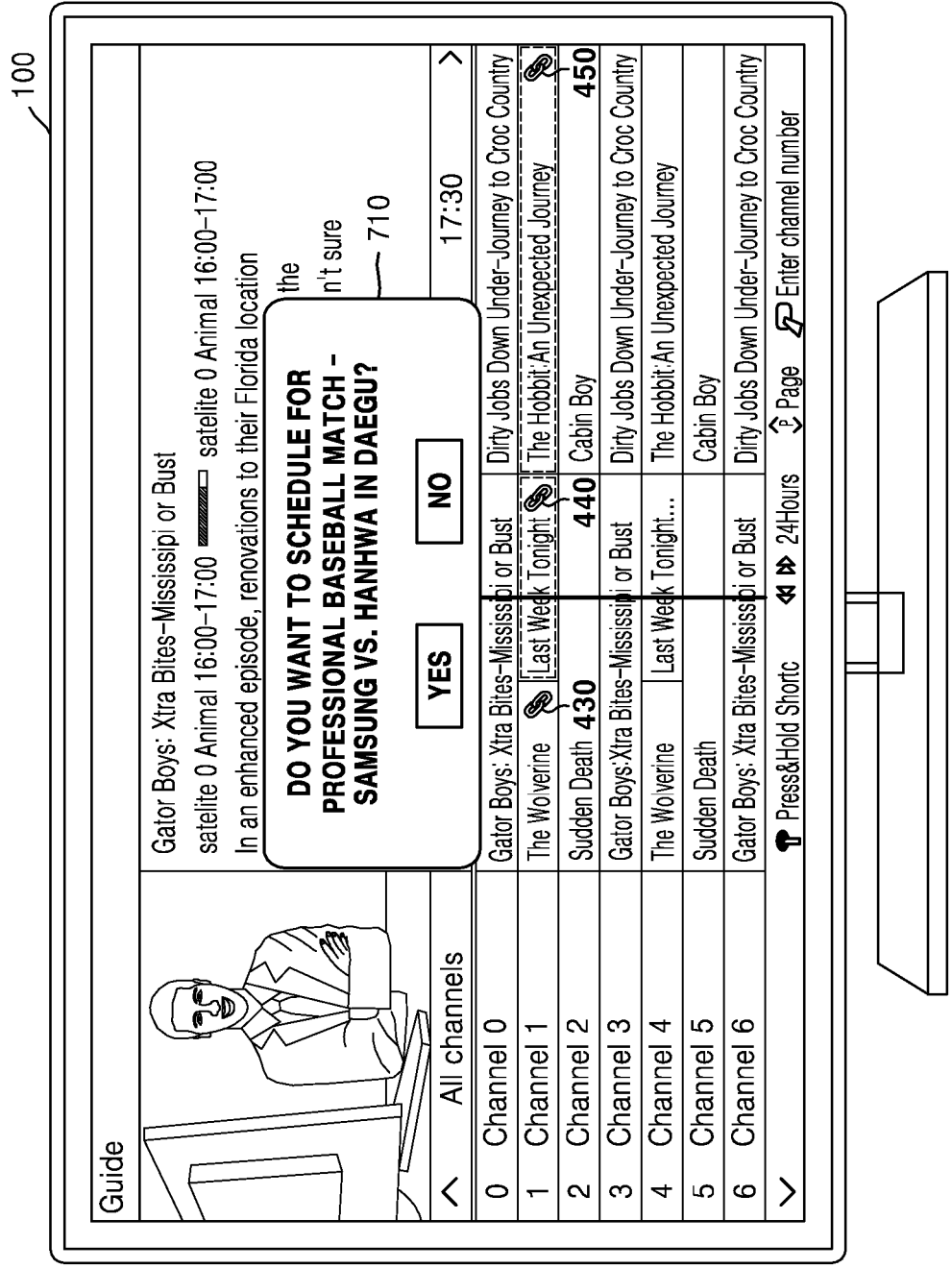

FIGS. 6, 7 and 8 are diagrams illustrating an example method of operating an image display device when an input selecting a connection icon is received according to an example embodiment.

Referring to FIG. 6, the image display device 100 may receive an input selecting the first connection icon 310 displayed on an ESG. For example, a user may select the first connection icon 310 using a control device, but the present disclosure is not limited thereto.

Meanwhile, as described above with reference to FIG. 4, the first connection icon 310 may be a connection icon corresponding to a first target service that is available at a current time. For example, the current time may be included in a time period during which the first target service is available.

The image display device 100 may display a first message 510 inquiring whether to switch a current service to a target service in response to an input selecting the first connection icon 310.

At this time, the first message 510 may include content information provided by a first service (source service) in a time period during which the first target service is available (e.g., active time or inactive time) or information regarding content currently being provided by the first target service. For example, when the image display device 100 possesses content information (e.g., a content fragment) for the current time regarding the first target service, the image display device 100 may include the content information for the current time regarding the first target service in the first message 510. On the other hand, when there is no content information for the current time regarding the first target service, the image display device 100 may include information regarding content provided by the first service (source service) in the time period during which the first target service is available in the first message 510.

When the image display device 100 receives an input selecting an object ("YES") included in the first message 510, the image display device 100 may terminate displaying of the ESG and switch the current service to the first target service. The image display device 100 may display content provided by the first target service at the current time. For example, as illustrated in FIG. 6, when a baseball broadcasting program is being provided by the first target service at the current time, a baseball broadcasting image may be displayed by receiving a broadcasting signal corresponding to the first target service.

Referring to FIG. 7, the image display device 100 according to an example embodiment may display a second message 610 indicating content in a target service is terminated, in response to an input selecting the first connection icon 310.

The image display device 100 according to an example embodiment may determine whether the content information for the current time regarding the first target service corresponding to the first connection icon 310 match content information provided by the first service (source service) in the time period during which the first target service is available.

When the content information for the current time regarding the first target service does not match the content information provided by the first service in the time period during which the first target service is available, the image display device 100 may notify that the content of a target service connected to the first service (e.g., "Professional Baseball Match—Samsung vs. Hanhwa in Daegu) is terminated and display the second message 610 including the content information for the current time regarding the first target service (e.g., "Professional Baseball Match—Doosan vs. Lotte in Seoul).

At this time, when the image display device 100 receives an input selecting an object ("YES") included in the second message 610, the image display device 100 may terminate displaying of the ESG and switch the current service to the first target service. Furthermore, the image display device 100 may display the content currently being provided at the current time in the first target service.

For example, when the broadcast program "Professional Baseball Match—Doosan vs. Lotte in Seoul" is being provided by the first target service at the current time, the image display device 100 may receive a broadcasting signal corresponding to the first target service and display video corresponding to the broadcast program "Professional Baseball Match—Doosan vs. Lotte in Seoul".

On the other hand, when the content information for the current time regarding the first target service match the information regarding the content provided by the first service (source service) in the time period during which the first target service is available, the image display device 100 may display the first message 510 including the information regarding the content provided by the first service (source service) in the time period during which the first target service is available or information regarding the content currently being provided by the first target service, as described above with reference to FIG. 6.

Referring to FIG. 8, the image display device 100 may receive an input selecting a second connection icon 450. Here, as described above with reference to FIG. 5, the second connection icon 450 may be a connection icon corresponding to a target service (e.g., a third target service) to become available in the future from the current time. For example, a time period during which the third target service is available may be in the future from the current time.

In response to the input selecting the second connection icon 450, the image display device 100 may display a third message 710 inquiring whether to scheduled switching to the third target service.

When the image display device 100 receives an input selecting an object ("YES") included in the third message 710, the image display device 100 may schedule switching to the third target service. When switching to the third target service is scheduled, the image display device 100 may switch the current service to the third target service when time period during which the third target service is available (e.g., active time) comes.

Figure 9:
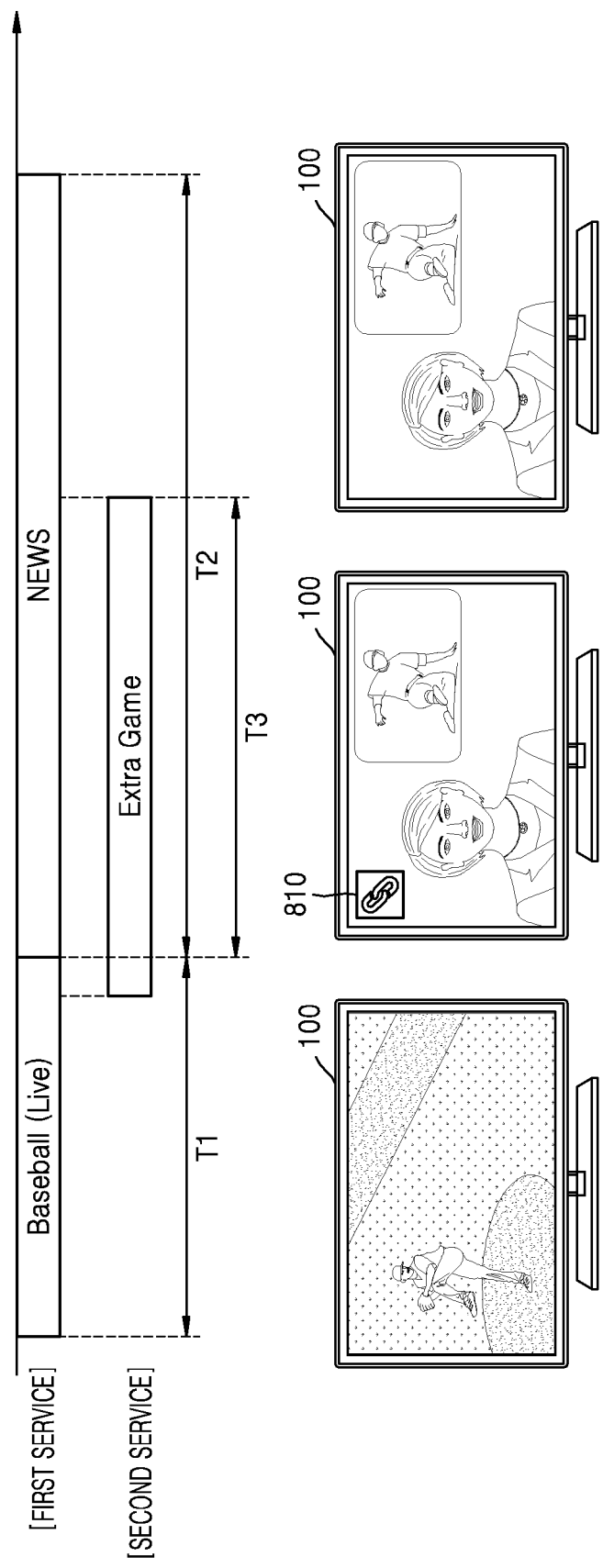
FIGS. 9 and 10 are diagrams illustrating an example method in which an image display apparatus displays a connection icon, according to an example embodiment.
Figure 10:
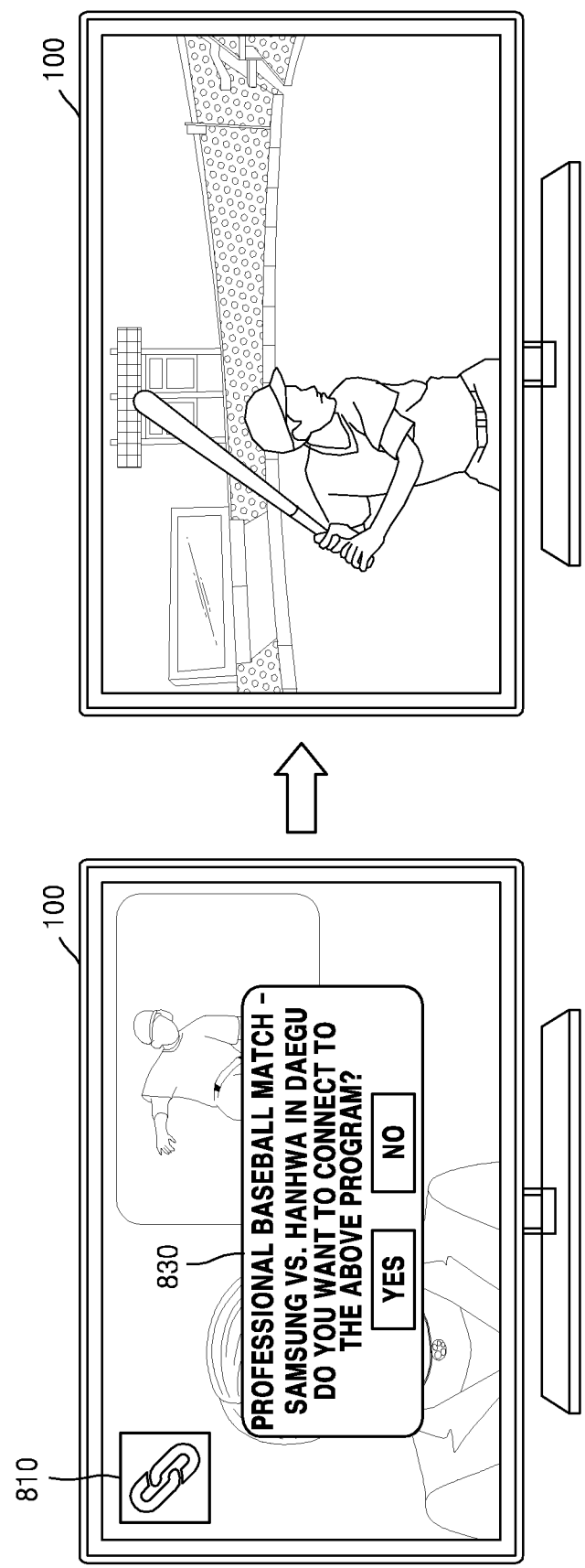

FIGS. 9 and 10 are diagrams illustrating an example method in which an image display apparatus displays a connection icon, according to an example embodiment.

The image display apparatus 100 according to an example embodiment may receive a broadcast signal corresponding to a first service and display broadcast images generated based on the received broadcast signal on a display. For example, when the first service provides a baseball broadcast during a first time period T1, the image display apparatus 100 may display images corresponding to the baseball broadcast. Furthermore, when a news broadcast is provided during a second time period T2 in the first service, the image display apparatus 100 may display images corresponding to the news broadcast.

Meanwhile, a second service may be a service connected to the first service in order to provide a baseball broadcast after the first time period T1.

The image display apparatus 100 may receive linkage service information for the first service. At this time, the linkage service information for the first service may include information regarding the second service (e.g., identification information regarding the second service), information indicating a time period during which the second service is available, information regarding a protocol for providing the second service, information regarding a necessary capability of a receiver for reproducing the second service, etc.

The image display device 100 may display a connection icon 810 in the time period during which the second service is available, where the time period during which the second service is available may include a time period during which a baseball broadcasting program is provided by the second service. The time period during which the baseball broadcasting program is provided by the second service may be determined based on ESG data regarding the second service.

For example, when there is ESG data regarding the second service, the image display device 100 may determine times for providing content (content starting time and content ending time) based on content information and schedule information included in an ESG, and thus the image display device 100 may determine the starting time and the ending time of the baseball broadcasting program in the second service.

Alternatively, the image display device 100 may determine times for providing the baseball broadcasting program based on linkage service information for the second service.

For example, linkage type information "replacement" included in the linkage service information may indicate that a source service is automatically switched from to a target service when inactive time comes. Therefore, when the linkage type information included in the linkage service information for the second service is "replacement", the second service (target service) may be automatically switched to the first service (source service) when an inactive time comes. At this time, it may be indicated that the second service is not available after the inactive time, and the image display device 100 may determine the inactive time as the ending time of the content (e.g., a baseball broadcasting program) provided by the second service.

The image display device 100 according to an example embodiment may display the connection icon 810 in a news broadcasting image provided by the first service during a third time period T3 during which a baseball broadcasting program is being provided by the second service. Furthermore, when the baseball broadcasting program ends in the second service (after the third time period T3), no connection icon may be displayed in a news broadcasting image provided by the first service.

Meanwhile, while the connection icon 810 is being displayed, the image display device 100 may receive an input selecting the connection icon 810. In response to the input selecting the connection icon 810, the image display device 100 may display a first message 830 inquiring whether to switch a current service to a target service, as shown in FIG. 10.

At this time, the first message 830 may include information regarding content provided by the first service at a time point at which the first target service becomes available or content information of the current time regarding the first target service. Since description thereof is given above with reference to FIG. 6 a detailed description thereof will not be repeated.

When the image display device 100 receives an input selecting a first object ("YES") included in the first message 830, the image display device 100 may terminate displaying of the ESG and switch the current service to the first target service. The image display device 100 may display content being provided at the current time in the first target service.

For example, as illustrated in FIG. 10, when a baseball game overtime broadcasting program is being provided by the first target service at the current time, a broadcasting signal corresponding to the first target service may be received and the baseball game overtime broadcasting program may be provided.

Figure 11:
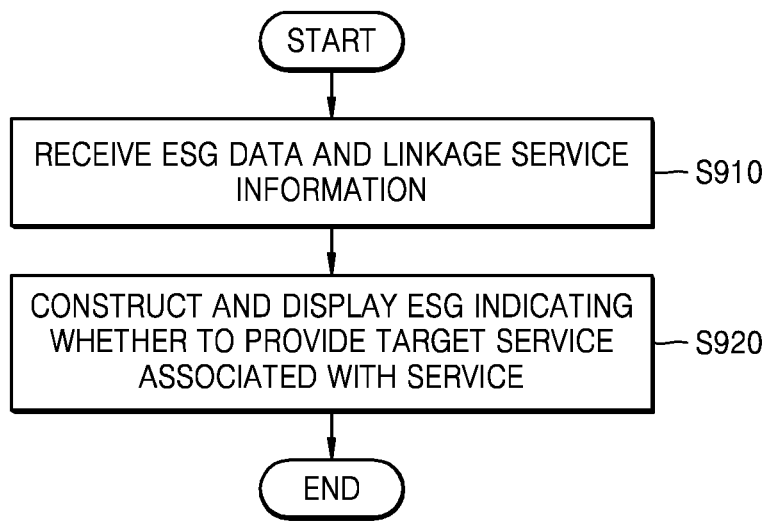

FIG. 11 is a flowchart illustrating an example method of operating an image display device according to an example embodiment.

Referring to FIG. 11, the image display device 100 according to an example embodiment may receive ESG data and linkage service information (operation S910).

For example, the image display device 100 may receive ESG data and linkage service information through a broadcasting network or a broadband (Internet network). Here, in case of receiving ESG data and linkage service information through a broadcasting network, the image display device 100 may sequentially receive broadcasting signals (e.g., RF signals) regarding necessary services and may obtain ESG data and linkage service information included in the ESG data.

The image display device 100 may construct and display an ESG indicating whether to provide a target service associated with a service (operation S920).

The image display device 100 may construct and display an ESG including a list of contents provided according to time periods in each of a plurality of services, by using the ESG data. Furthermore, the image display device 100 may display a connection icon indicating a target service that may be provided at the current time or a connection icon indicating a target service that may be provided in the future on in and ESG by using ESG data and linkage service information for the service.

Figure 12:
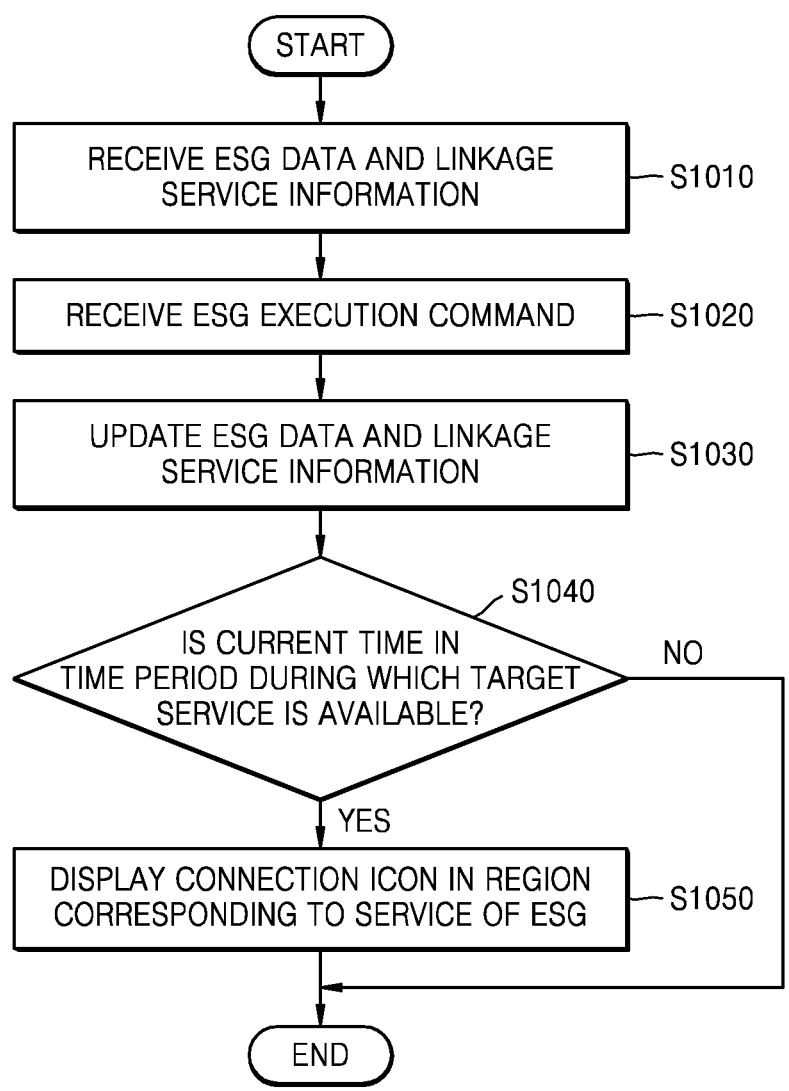

FIG. 12 is a flowchart illustrating an example method of operating an image display device according to an example embodiment.

Referring to FIG. 12, the image display device 100 according to an example embodiment may receive ESG data and linkage service information (operation S1010).

The image display device 100 may update the ESG data and the linkage service (operation S1030) information when an ESG execution command is received (operation S1020).

For example, the image display device 100 may determine whether ESG data and linkage service information stored in the image display device 100 are the latest version. The image display device 100 may check versions of ESG data and linkage service information stored therein and may update the ESG data when the ESG data is not the latest version.

The image display device 100 determines whether the current time is included in a time period during which a target service included in the linkage service information is available (operation S1040) and, when the current time is included in the time period during which the target service is available, may display a connection icon in a region of the ESG corresponding to a source service regarding the target service (operation S1050).

For example, as illustrated in FIG. 4, when the current time is included in a time period during which a first target service connected to a first service (e.g., "channel 1") from among a plurality of services is available, the image display device 100 may display a first connection icon 410 in a region 415 corresponding to the first service.

Figure 13:
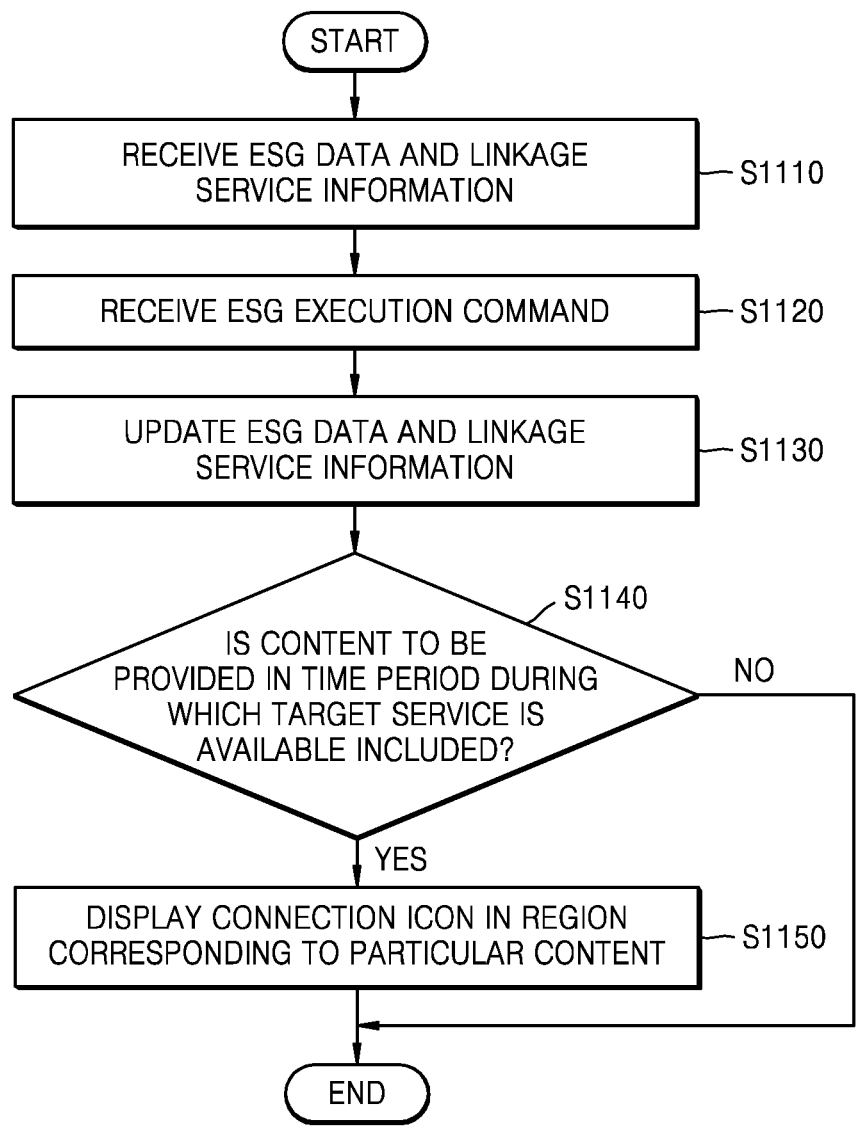

FIG. 13 is a flowchart illustrating an example method of operating an image display device according to an example embodiment.

Referring to FIG. 13, the image display device 100 according to an example embodiment may receive ESG data and linkage service information (operation S1110).

When the image display device 100 receives an ESG execution command (operation S1120), the image display device 100 may update the ESG data and the linkage service information (operation S1130).

In operation S1140, the image display device 100 may determine whether the ESG data includes content provided in a time period during which a target service is available in a source service connected to the target service using the ESG data and the linkage service information and display a connection icon in a region corresponding to a particular content in the ESG (operation S1150).

For example, as illustrated in FIG. 5, when the active time of the first target service (a time point at which the first target service becomes available) is between a starting time and an ending time of first content previously provided by a first service (e.g., "channel 1"), the image display device 100 may display the connection icon 430 corresponding to the first target service in the region 435 corresponding to the first content.

FIG. 14 is a flowchart illustrating an example method of operating an image display device according to an example embodiment.

Referring to FIG. 14, the image display device 100 according to an example embodiment may display a connection icon (operation S1210). For example, as illustrated in FIGS. 4 and 5, the image display device 100 may display a connection icon indicating whether a target service is provided in an ESG. Alternatively, the image display device 100 may display a connection icon on a broadcasting program image, as shown in FIG. 9. However, the present disclosure is not limited thereto.

The image display device 100 according to an example embodiment may receive an input selecting a connection icon (operation S1220).

The image display device 100 may display a first message inquiring whether to switch a current service to a target service in response to an input selecting a connection icon.

At this time, the image display device 100 determines whether information regarding first content currently being provided by a target service corresponding to the selected connection icon exists (operation S1230) and, when information regarding the first content does not exist, the image display device 100 may include information regarding second content provided by a source service in a time period during which the target service is available in the first message (operation S1240).

On the other hand, when information regarding the first content exists, the image display device 100 may determine whether the information regarding the first content is identical to information regarding the second content information (operation S1250) and, when the information regarding the first is identical to information regarding the second content information, may include the information regarding the first content in a first message and display the first message (operation S1270).

On the other hand, when the information regarding the first content is not identical to the information regarding the second content, the image display device 100 may display a message indicating termination of the content of the target service associated with the source service (operation S1260) and include the information regarding the first content in a first message and display the first message.

An image display device according to an example embodiment provides linkage service information through an ESG, and thus a user may use the linkage service even when the user is not watching a service providing linkage service. Furthermore, a user may identify services providing linkage service through an ESG according to an example embodiment and switch to a program that provides linkage service. As a result, the user convenience may be improved.

The above-described example embodiments of the present disclosure may be implemented as programmable instructions executable by a variety of computer components and stored in a computer readable recording medium. The computer readable recording medium may include program instructions, a data file, a data structure, or any combination thereof. The program instructions stored in the computer readable recording medium may be designed and configured specifically for the present invention or can be publicly known and available to those skilled in the field of software. Examples of the computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter.

It should be understood that the various example embodiments described herein should be considered in a descriptive sense only and not for purposes of limitation. Descriptions of features or aspects within each example embodiment should typically be considered as available for other similar features or aspects in other example embodiments.

What is claimed is:

1. An image display device comprising:
   a display;
   a processor; and
   a memory,
   wherein one or more programs are stored in the memory and the processor is configured to execute the one or more programs stored in the memory,
   wherein the one or more programs comprise instructions for:
   receiving electronic service guide (ESG) data for generating an ESG with respect to a plurality of content items to be provided through a plurality of channels and linkage service information for a first service provided through a first channel of the plurality of channels, wherein the ESG data includes schedule information comprising a start time and an end time for a first content item of the plurality of content items, and wherein a part of the first content item is provided through the first service during a first time duration and a remaining part of the first content item is provided through a linkage service during a second time duration subsequent to the first time duration:
   generating the ESG based on the ESG data and the linkage service information;
   displaying the generated ESG on the display; and
   in response to the linkage service being available during the second time duration, based on time information included in the linkage service information, displaying, on the ESG, an icon indicating that the linkage service for providing the remaining part of the first content item is available, in a region corresponding to the first content item included in the ESG.

2. The image display device of claim 1, wherein the one or more programs further comprise instructions for:
   receiving the ESG data and the linkage service information via a broadcasting network or broadband.

3. The image display device of claim 1, wherein the one or more programs further comprise instructions for: updating the ESG data and the linkage service information.

4. The image display device of claim 1, wherein the one or more programs further comprise instructions for: receiving service layer signaling (SLS) corresponding to the first service and obtaining the linkage service information from the SLS.

5. The image display device of claim 1, wherein the one or more programs further comprise instructions for: obtaining the linkage service information from a user service bundle description (USBD) fragment included in service layer signaling (SLS),
   wherein the linkage service information comprises information for linkage type.

6. The image display device of claim 1, wherein the one or more programs further comprise instructions for: displaying the icon in the region corresponding to the first content item in response to the linkage service associated with the first service being available at a current time which is between the start time and the end time of the first content item.

7. The image display device of claim 1, wherein the one or more programs further comprise instructions for:
   displaying a message inquiring whether to switch the first service to the linkage service in response to receiving an input for selecting the icon.

8. The image display device of claim 7, wherein the one or more programs further comprise instructions for: displaying the message including at least one of information regarding a content item currently being provided by the linkage service, and information regarding the first content item.

9. The image display device of claim 8, wherein the one or more programs further comprise instructions for: displaying a message indicating termination of the first content item, when the information regarding the content item currently being provided by the linkage service does not match the information regarding the first content item.

10. A method of operating an image display device, the method comprising:

receiving electronic service guide (ESG) data for generating an ESG with respect to a plurality of content items to be provided through a plurality of channels and linkage service information for a first service provided through a first channel of the plurality of channels, wherein the ESG data includes schedule information comprising a start time and an end time for a first content item of the plurality of content items, and wherein a part of the first content item is provided through the first service during a first time duration and a remaining part of the first content item is provided through a linkage service during a second time duration after the first time duration;

generating the ESG based on the ESG data and the linkage service information;

displaying the generated ESG on the image display device; and in response to the linkage service being available during the second time duration, based on time information included in the linkage service information displaying the ESG including an icon indicating that the linkage service providing the remaining part of the first content item is available, in a region corresponding to the first content item including in the ESG.

11. The method of claim 10, wherein the receiving of the ESG data and the linkage service information comprises receiving the ESG data and the linkage service information via a broadcasting network or broadband.

12. The method of claim 10, further comprising updating the ESG data and the linkage service information.

13. The method of claim 10, wherein the receiving of the ESG data and the linkage service information comprises:

receiving service layer signaling (SLS) corresponding to the first service; and obtaining the linkage service information from the SLS.

14. The method of claim 10, wherein the icon is displayed in the region corresponding to the first content item in response to the linkage service associated with the first service being available at a current time which is between the start time and the end time of the content item.

15. The method of claim 10, further comprising:

receiving an input for selecting the icon; and displaying a message inquiring whether to switch a current service to the linkage service in response to receiving the input for selecting the icon, wherein the message comprises at least one of:

information regarding content currently being provided by the linkage service, and information regarding the first content item.

16. A non-transitory computer readable recording medium having recorded thereon a computer program which, when executed by a processor of an image display device, controls the image display device to at least:

receive electronic service guide (ESG) data for generating an ESG with respect to a plurality of content items to be provided through a plurality of channels and linkage service information for a first service provided through a first channel of the plurality of channels, wherein the ESG data includes schedule information comprising a start time and an end time for a first content item of the plurality of content items, and wherein a part of the first content is provided through the first service during a first time duration and a remaining part of the first content item is provided through a linkage service during a second time duration subsequent to the first time duration;

generate the ESG based on the ESG data and the linkage service information;

display the generated ESG on the image display device; and in response to the linkage service being available during the second time duration, based on time information included in the linkage service information, display the ESG including an icon indicating that the linkage service for providing the remaining part of the first content item is available, in a region corresponding to the first content item included in the ESG.

* * * * *